United States Patent
Lohmann

(10) Patent No.: US 11,469,037 B2
(45) Date of Patent: Oct. 11, 2022

(54) MAGNET COIL WITH REDUCED LOSSES AND SYSTEMS FOR WIRELESS POWER TRANSFER

(71) Applicant: TDK Electronics AG, Munich (DE)

(72) Inventor: Thomas Lohmann, Solothurn (CH)

(73) Assignee: TDK Electronics AG, Munich (DE)

(*) Notice: Subject to any disclaimer, the term of this patent is extended or adjusted under 35 U.S.C. 154(b) by 0 days.

(21) Appl. No.: 16/948,942

(22) Filed: Oct. 6, 2020

(65) Prior Publication Data

US 2021/0104358 A1    Apr. 8, 2021

(30) Foreign Application Priority Data

Oct. 8, 2019 (DE) .......................... 102019127001.4

(51) Int. Cl.

| | |
|---|---|
| H01F 27/34 | (2006.01) |
| H02J 50/10 | (2016.01) |
| H02J 50/70 | (2016.01) |
| H01F 27/28 | (2006.01) |
| H01F 38/14 | (2006.01) |
| H01F 27/24 | (2006.01) |

(52) U.S. Cl.
CPC ............. *H01F 27/34* (2013.01); *H01F 27/28* (2013.01); *H01F 38/14* (2013.01); *H02J 50/10* (2016.02); *H02J 50/70* (2016.02); *H01F 27/24* (2013.01)

(58) Field of Classification Search
CPC .......... H01F 27/34; H01F 27/28; H01F 38/14; H01F 27/24; H01F 27/38; H01F 27/255; H02J 50/10; H02J 50/70; H02J 50/005
See application file for complete search history.

(56) References Cited

U.S. PATENT DOCUMENTS

| | | | |
|---|---|---|---|
| 5,917,307 A | 6/1999 | Watanabe | |
| 2009/0072628 A1 | 3/2009 | Cook | |
| 2015/0145342 A1* | 5/2015 | Chiyo | ..................... H01F 38/00 336/170 |
| 2015/0170833 A1* | 6/2015 | Widmer | ................ B60L 53/122 307/104 |
| 2018/0331578 A1 | 11/2018 | Covic | |
| 2019/0082555 A1* | 3/2019 | Hooton | .................... B41M 5/24 |

FOREIGN PATENT DOCUMENTS

| | | |
|---|---|---|
| DE | 102011107620 A1 | 1/2013 |
| WO | WO 2011/112795 A1 | 9/2011 |
| WO | WO 2015/087138 A2 | 6/2015 |

* cited by examiner

*Primary Examiner* — Lincoln D Donovan
*Assistant Examiner* — Alex W Lam
(74) *Attorney, Agent, or Firm* — Nixon Peabody LLP

(57) ABSTRACT

A magnet coil with reduced losses is stated. The coil has for this purpose a coil core and a winding, the turns of which are distributed over a plurality of portions which are mutually spaced.

17 Claims, 3 Drawing Sheets

MAGNET COIL WITH REDUCED LOSSES AND SYSTEMS FOR WIRELESS POWER TRANSFER

CROSS-REFERENCE TO RELATED APPLICATIONS

This application claims priority to and the benefit of German Application No. 102019127001.4, filed Oct. 8, 2019, which is incorporated by reference in its entirety.

FIELD OF THE INVENTION

The invention relates to magnet coils with reduced losses, as may for example be used in systems for wireless power transfer, and to corresponding systems for wireless power transfer.

BACKGROUND OF THE INVENTION

Systems for the wireless transfer of power, for example electrical power, conventionally have a primary coil and a secondary coil. A time-variable magnetic field is emitted by the primary coil and received by the secondary coil. The primary coil and the secondary coil need not be electrically interconnected and may be mutually spaced.

It is here possible for one or more of the coils to have one or more windings around a coil core. Typical coil core materials consist of or comprise ferrite. A certain amount of the transferred power is here generally dissipated, i.e. converted into heat, in the coil core.

One option for reducing power loss involves increasing the volume of the ferrite core.

However, increasing the coil core volume increases the costs of such systems since more ferrite material is required. Furthermore, the design becomes bulkier, which is contrary to the trend towards component miniaturisation. Besides, an increased volume complicates dissipation of the heat arising from the power loss.

There is therefore a desire for magnet coils with reduced losses. Specifically, there is demand for magnet coils which require less ferrite in the coil core, are capable of ensuring good heat dissipation, have a reduced mass, are straightforwardly integrable into systems and can be provided at reduced cost.

SUMMARY OF THE INVENTION

A magnet coil according to the independent claim is stated for this purpose. Dependent claims state advantageous configurations.

The magnet coil has a coil core and a winding. The turns of the winding are wound around an axis. The turns of the winding are here distributed across a plurality of portions and the portions of the winding are mutually spaced.

Such spatial subdivision of the turns of the winding of a magnet coil distributes the associated magnetic flux across a larger volume. Magnetic flux density is thus reduced. Power loss in magnet coil cores is determined by the Steinmetz equation. The power loss is here proportional to $B_m^y$, wherein $B_m$ is the magnetic flux density and y a material constant of the coil core. For a typical ferrite material, for example PC95, y is approx. 2.84. In other words, power loss is superproportional to the magnetic flux density and distributing a magnetic flux of a certain magnitude over a larger volume reduces the power loss as a result of the reduction in maximum flux density.

Each portion of the winding may comprise a helical winding with one or more layers.

It is possible for the coil to consist virtually solely of the spaced portions, between which no further complete turns, but optionally electrical connections, are arranged.

It is possible for the axis to extend through the coil core.

It is correspondingly also possible for the coil core to comprise a ferrite material or to consist of a ferrite material The ferrite material may be selected from the following materials: ferrite N87 from TDK Corporation, ferrite N95 from TDK Corporation, ferrite N97 from TDK Corporation, ferrite PC47 from TDK Corporation or ferrite PC95 from TDK-Corporation.

It is possible for the coil core to be selected from a cylindrical coil core, a plate-shaped coil core or a plate-shaped coil core with a rectangular base area.

Plate-shaped coil cores with a rectangle as the base area are virtually cuboids with a length, a width and a thickness. It is accordingly possible for the coil core to have a rectangular base area with a width b and a length l. The coil core may furthermore have a thickness d. The width may amount to 200 mm or more and 300 mm or less. The length may amount to 350 mm or more and 450 mm or less. The thickness may amount to 9 mm or more and 15 mm or less.

In particular, the width may amount to 250 mm, the length to 400 mm and the thickness to 12 mm.

The number of portions may amount to two, three, four, five or six or more.

In particular, it is possible for the number of portions to amount to precisely two.

It is possible for two portions of the winding to be arranged at opposing ends of the coil core.

In particular, it is possible for two portions to be arranged at opposing ends of the coil core and for the two opposing ends to be the ends of a cuboidal coil core which are spaced furthest apart.

It is possible for the spacing between portions of the winding to be greater than 0 and less than 0.9 in units of coil core length l. Alternatively or additionally, it is possible for the spacing in units of l to be 0.2 or greater and 0.9 or smaller. Furthermore, it is possible for the spacing in units of l to be 0.4 or greater and 0.9 or smaller. Furthermore, it is possible for the spacing in units of l to be 0.6 or greater and 0.9 or smaller. Furthermore, it is possible for the spacing in units of l to be 0.8 or greater and 0.9 or smaller.

A preferred spacing in units of l is 0.6.

It is possible for a portion to have a spatial extent in the direction of the winding axis of 0.15 or more and 0.25 or less in units of l. An extent in the direction of the winding axis may amount to 0.2 l.

It is possible for the magnet coil furthermore to comprise a thermal bridge. The thermal bridge may be arranged in the axial direction, i.e. in a direction along the winding axis, between two portions of the winding and on the coil core. In particular, it is possible for the thermal bridge to be provided and suitable for dissipating heat from the coil core to the external surroundings.

The external surroundings of the magnet coil may be an atmosphere, for example air, surrounding the magnet coil.

It is furthermore possible for the magnet coil to be fastened to a device. The thermal bridge may then be provided and suitable for dissipating heat from the coil core to the device and to the atmosphere. The thermal bridge may have cooling fins.

The device to which the magnet coil may be fastened may be the recipient of the electrical power which the magnet coil receives in the form of magnetic power. In this way, a rechargeable energy storage system of a vehicle or of another mobile object may for example be charged.

It is accordingly possible for the magnet coil to be a secondary coil of a system for wireless transfer of electrical power.

A system for wireless transfer of electrical power may accordingly have as secondary coil a magnet coil as described above and additionally a primary coil.

It is possible for the primary coil to be a double-D coil which comprises two coil portions which, unlike the above-described secondary coil, are not coaxially wound, but the two windings of which are instead arranged beside one another in the same plane.

It is alternatively possible for the primary coil to comprise a solenoid coil or a spiral coil or a circular coil.

BRIEF DESCRIPTION OF THE DRAWINGS

Central aspects of the magnet coil and details of preferred embodiments are explained in greater detail with reference to the schematic figures.

DETAILED DESCRIPTION

Figure 1:
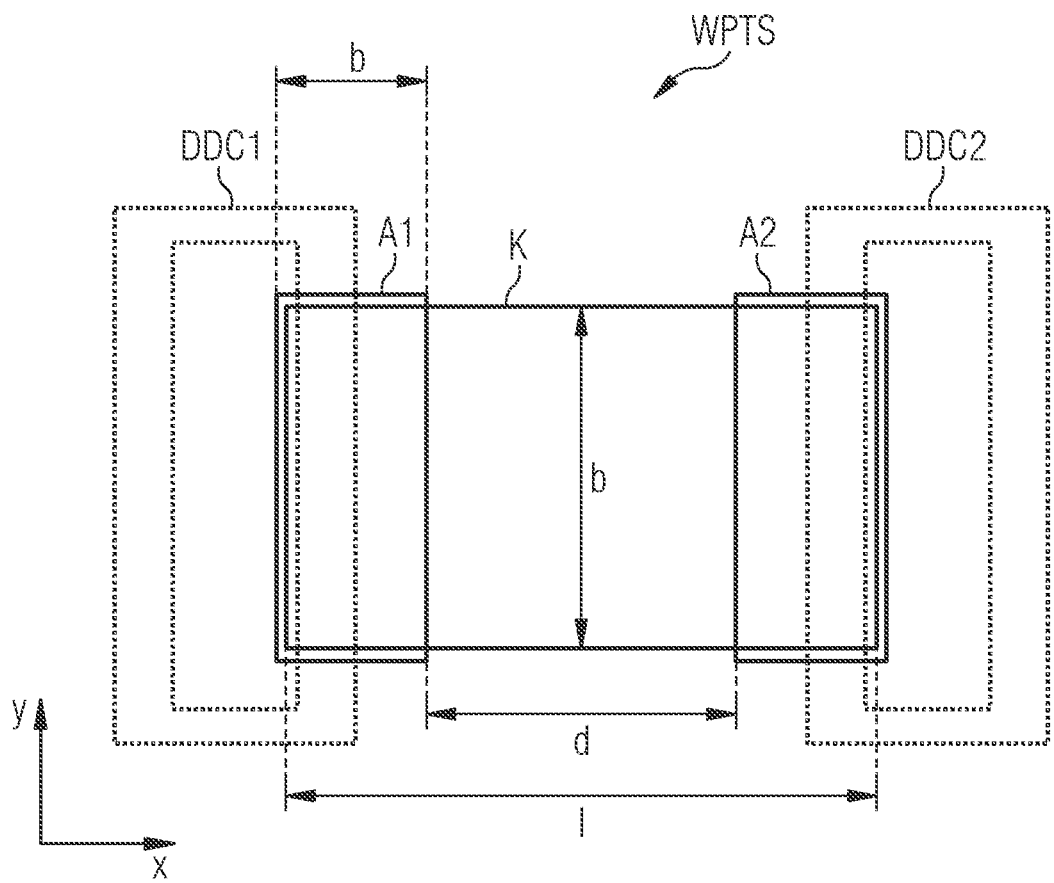
FIG. 1 shows the relative arrangement of coil core and the portions in plan view.

FIG. 1 shows the arrangement of the two portions A1, A2 of a coil, the winding of which is divided into two portions, in relation to the associated coil core K in plan view. The coil core K has a rectangular base area with a length l in the axial direction x and a width b in the lateral direction y. The two portions A1, A2 of the winding are arranged at the ends of the coil core K which are spaced furthest apart. The portions have a spacing d. FIG. 1 shows a form of the magnet coil with precisely two portions.

The two portions DDC1, DDC2 of a primary coil in double-D configuration are shown in dashed lines. Coil portions DDC1, DDC2 of the primary coil form, together with the two portions A1, A2 and the coil core K of the magnet coil as secondary coil, the magnetically active components of a wireless electrical power transfer system (WPTS).

Dividing the winding of the secondary coil into two spaced portions distributes the magnetic flux over a greater volume, specifically in the coil core K, such that the magnetic flux density in the coil core K is reduced. Due to the superproportional dependency of transfer losses on magnetic flux density, power or energy losses on transfer of electrical power are reduced.

Figure 2:
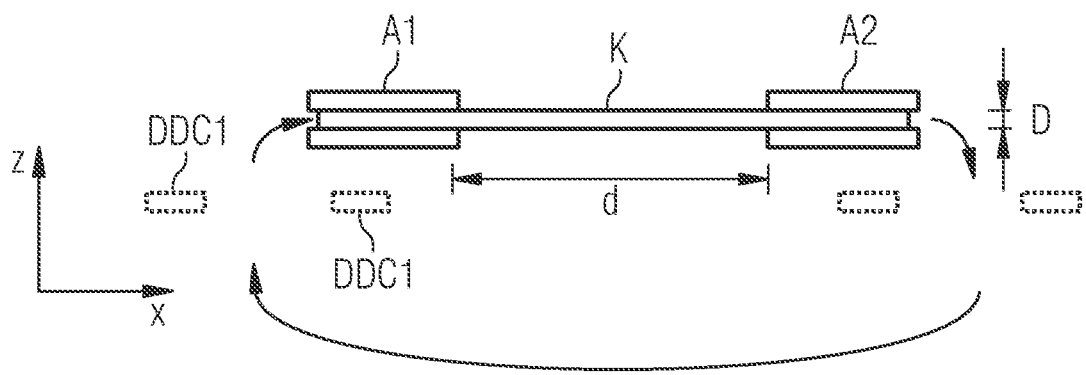
FIG. 2 shows the arrangement in cross-section.

FIG. 2 shows the arrangement of the components of the power transfer system in cross-section. Each of the two portions A1, A2 of the winding of the magnet coil has conductor portions which, viewed in the vertical direction (z), are arranged above the material of the magnet core K, and conductor portions which are arranged below the magnet core K.

The portions need not terminate flush with the magnet core K in the axial direction (x). It is possible for the portions of the winding to project beyond the respective ends of the coil core (as shown in FIG. 2). It is, however, also possible for the coil core to terminate exactly flush with the portions at the respective ends. It is also possible for the coil core K to project beyond each of the distal ends of the portions A1, A2.

The arrows substantially illustrate the course of the magnetic field lines at a certain point in time.

Figure 3:
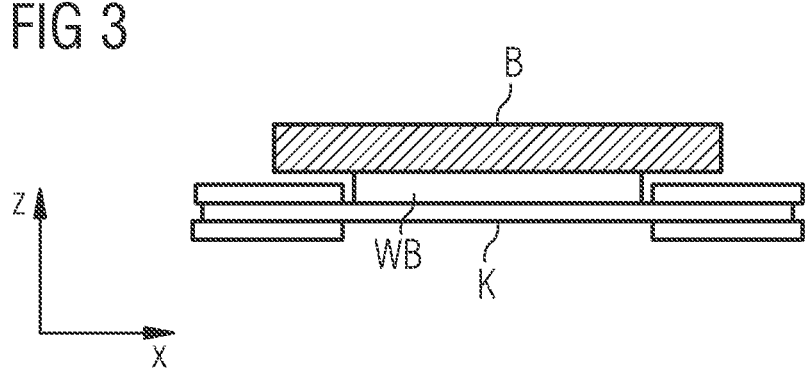
FIG. 3 shows the use of a thermal bridge.

FIG. 3 shows the possibility of using a thermal bridge WB to carry away dissipated power, which accumulates in the form of heat in the coil core K, to external surroundings. The external surroundings may in particular be a mounting base B of a device to which the magnet coil delivers electrical power.

Figure 4:
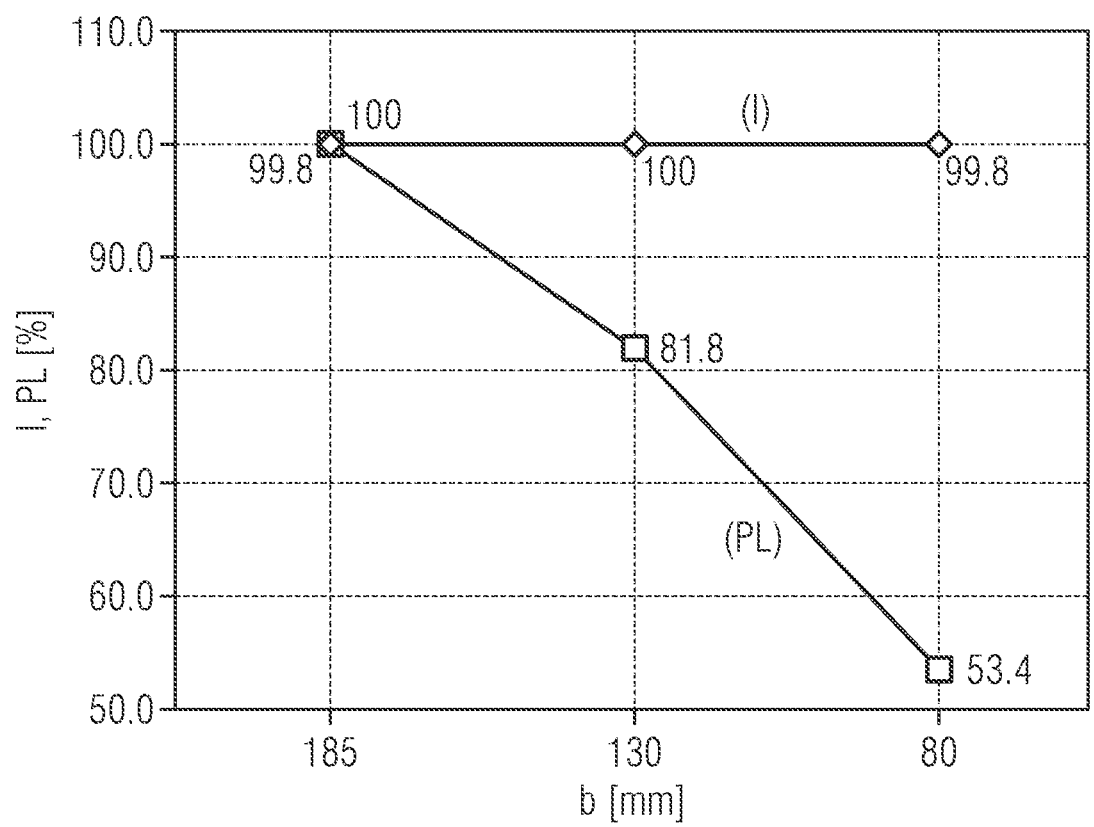
FIG. 4 shows the dependency of coil inductance and losses on the extent of a portion in the axial direction.
Figure 5:
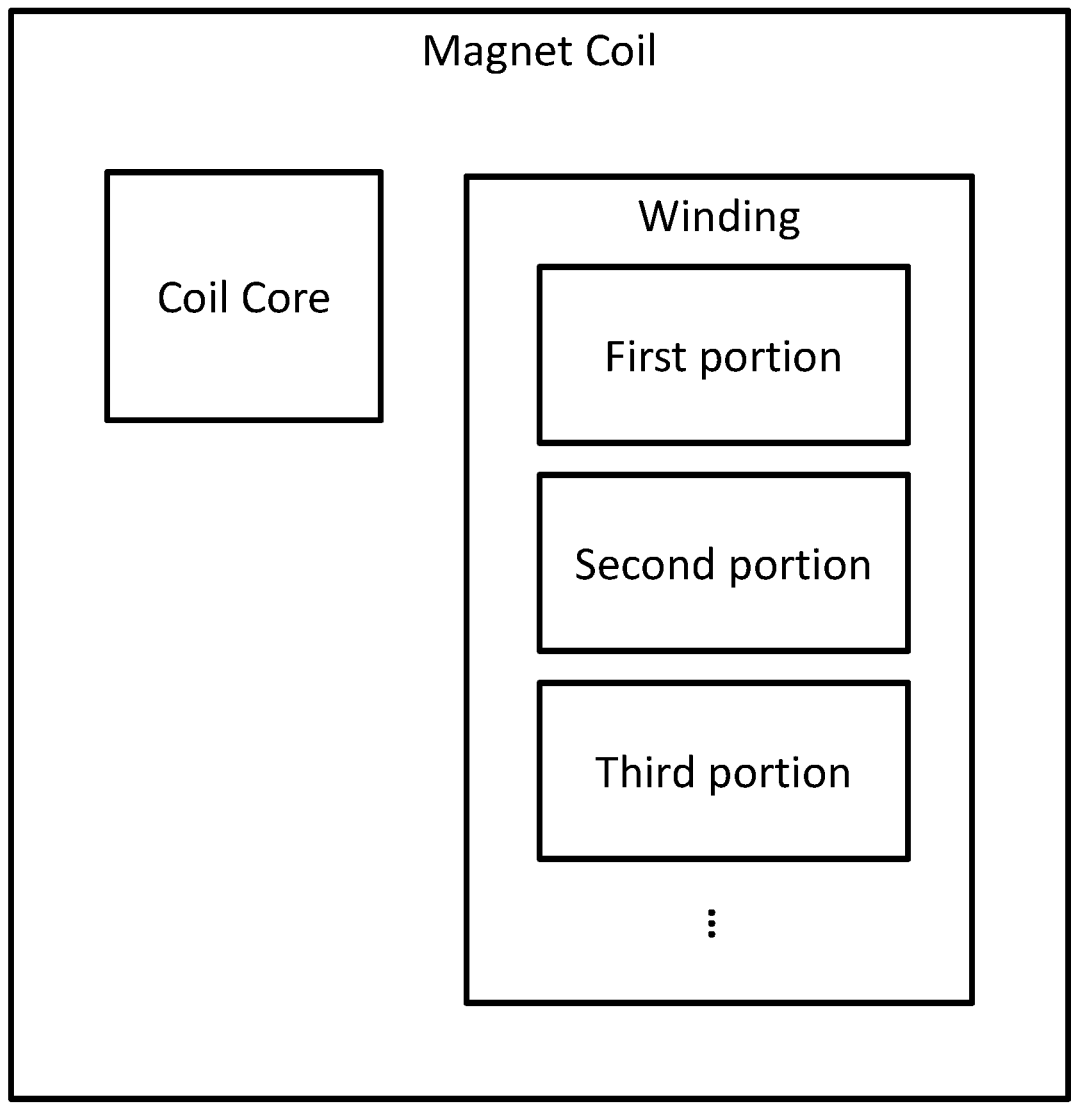
FIG. 5 shows a block diagram of a magnet coil, according to some embodiments.

FIG. 4 shows the dependency of inductance I and power losses PL on the width b of a winding portion of a secondary coil of a wireless power transfer system. While inductance remains substantially constant, power loss falls as width b declines. In other words, dividing a winding of a certain width into two mutually spaced portions each of a smaller width, distinctly reduces power losses.

The magnet coil is not limited to the technical features shown the figures or described above. The coil may have further conductor portions, for example for electrically interconnecting the portions, switches, electrical terminals for interconnection with an external circuit environment, further elements for guiding magnetic flux or fastening means for contacting.

LIST OF REFERENCE SIGNS

A1, A2 First and second portions of the magnet coil winding
b Width of the coil core
B Base for dissipating thermal energy
d Spacing of the winding portions
D Thickness of the coil core
DDC1, DDC2 Coil portions of a primary coil
I Inductance
K Coil core
Length of the coil core
PL Power loss
WB Thermal bridge
WPTS Wireless power transfer system
x Axial direction
y Transverse direction
z Vertical direction

The invention claimed is:

1. A magnet coil with reduced losses, comprising a coil core defining a common axis; and a winding having turns, the turns of the winding are wound around a common axis, the turns are distributed across a plurality of portions, the portions are mutually spaced along the common axis so as to reduce a magnetic flux density in the coil core during operation to reduce the energy losses; wherein the coil core has a length "l" in the direction of the axis and a distance "d" of the spacing between the portions is 0.2 l ≤d≤0.9 l.

2. A magnet coil according to claim 1, which consists solely of the spaced portions and electrical connections without a complete turn.

3. A magnet coil according to claim 2, wherein the common axis extends through the coil core.

4. A magnet coil according to claim 3, wherein the coil core is comprised of a ferrite material.

5. A magnet coil according to claim 1, wherein the coil core is selected from a cylindrical coil core, a plate-shaped coil core, or a plate-shaped coil core with a rectangular base area.

6. A magnet coil according to claim 5, wherein the coil core is plate-shaped and has a rectangular base area with a width b, a length l, and a thickness D, and wherein (i) 200 mm <b <300 mm, (ii) 350 mm <l <450 mm, and (iii) 9 mm <D <15mm.

7. A magnet coil according to claim 1, wherein the number of spaced portions is greater than 2.

8. A magnet coil according to claim 1, wherein two spaced portions are arranged at opposing ends of the coil core.

9. A magnet coil according to claim 1, further comprising a thermal bridge that is arranged in the axial direction between two portions of the winding and on the coil core, the thermal bridge being suitable for dissipating heat to external surroundings.

10. A magnet coil according to claim 1 which is a secondary coil of a wireless electrical power transfer system.

11. A system for wireless electrical power transfer comprising a magnet coil according to claim 1 as secondary coil and a primary coil.

12. A system according to claim 11, wherein the primary coil comprises a double-D coil, solenoid coil, a spiral coil or circular coil.

13. A magnet coil that is configured for reducing losses, comprising a coil core defining an axis; and a winding having turns that are wound around the axis of the coil core, the turns of the winding are grouped into at least a first portion and a second portion, the first portion being fully separated from the second portion by a region along the axis that lacks the turns of the winding so as to reduce a magnetic flux density in the coil core during operation to reduce the energy losses; wherein the coil core has a length "l" in the direction of the axis and a distance "d" of the spacing that separates the first portion and the second portion is 0.2 l d 0.9 l.

14. A magnet coil according to claim 13, wherein the coil core is selected from a cylindrical coil core, a plate-shaped coil core, or a plate-shaped coil core with a rectangular base area.

15. A magnet coil according to claim 14, wherein the coil core is plate-shaped and has a rectangular base area with a width b, a length l, and a thickness D, and wherein (i) 200 mm <b <300 mm, (ii) 350 mm <l <450 mm, and (iii) 9 mm <D <15mm.

16. A magnet coil according to claim 13, wherein the turns of the winding include a third grouped portion.

17. A magnet coil according to claim 13, wherein first and second portions are arranged at opposing ends of the coil core.

\* \* \* \* \*

UNITED STATES PATENT AND TRADEMARK OFFICE
CERTIFICATE OF CORRECTION

PATENT NO. : 11,469,037 B2
APPLICATION NO. : 16/948942
DATED : October 11, 2022
INVENTOR(S) : Thomas Lohmann It is certified that error appears in the above-identified patent and that said Letters Patent is hereby corrected as shown below:

In the Claims

At Column 5, Lines 1-3 (Claim 6, Lines 3-5), please delete "(i) 200 mm <b <300 mm, (ii) 350 <1 <450 mm, and (iii) 9 mm <D <15mm" and insert --(i) 200 mm $\leq$ b $\leq$ 300 mm, (ii) 350 mm $\leq$ l $\leq$ 450 mm, and (iii) 9 mm $\leq$ D $\leq$ 15mm-- therefor.

At Column 6, Lines 7-8 (Claim 13, Lines 11-12), please delete "the second portion is 0.2 l d 0.9 l" and insert --the second portion is 0.2 l $\leq$ d $\leq$ 0.9 l-- therefor.

At Column 6, Lines 16-17 (Claim 15, Lines 3-5), please delete "(i) 200 mm <b <300 mm, (ii) 350 mm <1 <450 mm, and (iii) 9 mm <D <15 mm" and insert --(i) 200 mm $\leq$ b $\leq$ 300 mm, (ii) 350 mm $\leq$ l $\leq$ 450 mm, and (iii) 9 mm $\leq$ D $\leq$ 15mm-- therefor.

Signed and Sealed this
Eighth Day of August, 2023

*Katherine Kelly Vidal*

Katherine Kelly Vidal
*Director of the United States Patent and Trademark Office*